Nov. 19, 1935.  G. A. PERKINS  2,021,698
VINYL ESTER
Filed Jan. 25, 1933
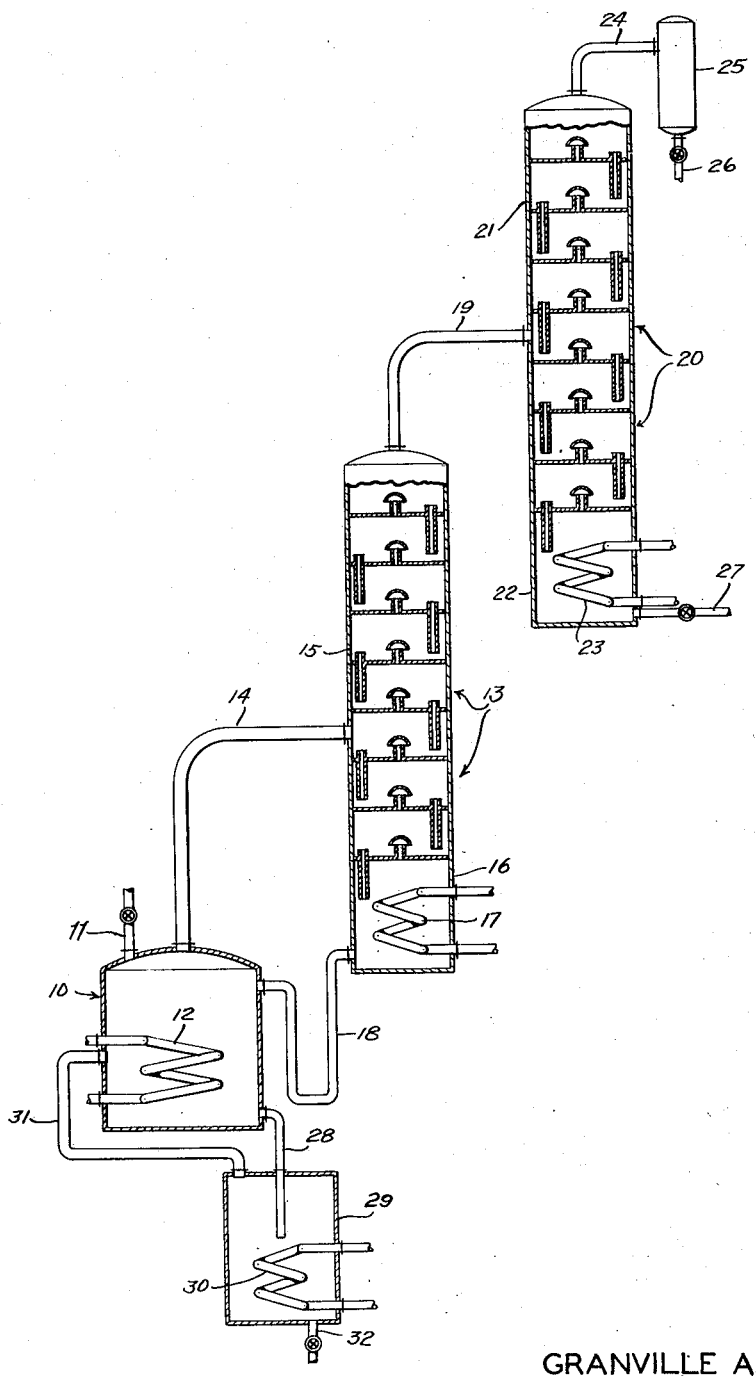
INVENTOR
GRANVILLE A. PERKINS
BY
ATTORNEY

UNITED STATES PATENT OFFICE 2,021,698

VINYL ESTER

Granville A. Perkins, South Charleston, W. Va., assignor to Carbide and Carbon Chemicals Corporation, a corporation of New York Application January 25, 1933, Serial No. 653,421

17 Claims. (Cl. 260—106)

The invention is a process for making vinyl esters, particularly vinyl esters of the lower aliphatic carboxylic acids. In general, the process comprises reacting acetaldehyde with the anhydride of an aliphatic carboxylic acid in the presence of a catalyst, all as more fully hereinafter described.

Previously proposed processes for making vinyl esters of carboxylic acids almost without exception start with acetylene which is transformed into the unsaturated ester under various conditions and with the aid of various catalysts. Since ethylidene diesters also may be made by these processes employing acetylene, in one instance it has been proposed to decompose the diester to form the vinyl ester.

My new process avoids the use of acetylene as a raw material and represents a departure from all of the previously known methods of making vinyl esters; its advantages will be apparent.

The reaction involved in my new process may be represented by the following equation in which the formation of vinyl acetate is shown by way of illustration:

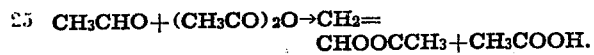

I prefer to employ paraldehyde, that is, para-acetaldehyde, a liquid trimer of acetaldehyde which boils at 124° C., as the source of the aldehyde in my process. Paraldehyde is readily obtainable by treating acetaldehyde at ordinary temperatures with small amounts of acids, such as sulfuric acid, sulfur dioxide or hydrochloric acid, or salts, such as zinc chloride or sodium acetate. The carboxylic acid anhydride may be the anhydride of any acid of which the vinyl ester is desired. For example, anhydrides of the lower aliphatic monocarboxylic acids, such as acetic, propionic and butyric, may be used, and other carboxylic acid anhydrides are suitable. I prefer to employ strong, non-volatile (by which is meant non-volatile at the reaction temperature), inorganic acids as catalysts: sulfuric, phosphoric and toluene-sulfonic acids are examples of suitable catalysts.

The process may be conducted by simple distillation of the reactants in the presence of the catalyst, but I prefer to employ special apparatus, one form of which is illustrated diagrammatically in the accompanying drawing.

The invention will be illustrated by the following examples:

Example 1

Vinyl acetate was prepared by mixing 1224 grams (12 mols) of acetic anhydride with 352 grams (8 mols) of paraldehyde and 12 grams (0.76% of reactants) of sulfuric acid. The mixture was boiled and the volatile products were continually removed through a fractionating column, the top of which was regulated to about 60° to 80° C.

The distillate was refractionated several times giving 132 grams of vinyl acetate distilling at 65° to 75° C. This represents an overall yield of 19% from paraldehyde of which an additional 43% was recovered as aldehyde. Most of the unused acetic anhydride was recovered by subsequent distillation of the residue in the reaction vessel, and a small amount of tarry and carbonaceous material was left behind.

Example 2

The reaction mixture of paraldehyde, acetic anhydride and sulfuric acid was allowed to stand several hours and it was then boiled in a flask connected for simple distillation, that is, no reflux was returned directly to the boiling flask. The vapors were led to continuous still, being introduced at a point near the middle of the column. The top of the continuous still was kept at about 100° C. so that acetaldehyde, vinyl acetate, and acetic acid passed over in the distillate, while higher boiling and unreacted material collected in the still kettle. This kettle was connected through a liquid seal to the reaction flask, and accumulated liquid was continually returned to the reaction mixture. Toward the end of the reaction the still head temperature was allowed to rise to about 130° C. in order to obtain the desired amount of distillate, as shown in the table. Considerable acetic anhydride distilled at this increased temperature.

The distillate was chilled rapidly to about −70° C. and was fractionated after the addition of 1 gram of copper acetate to prevent polymerization of the vinyl acetate and 5 grams of sodium acetate to neutralize some inorganic catalyst, probably sulfur dioxide, the adventitious presence of which apparently caused some losses of vinyl acetate in Example 1 through combination with acetic acid to form ethylidene diacetate. The tabulated data follow:

| | | |
|---|---|---|
| Acetic anhydride | grams | 1224 |
| Paraldehyde | do | 352 |
| Copper acetate | do | 1 |
| Sulphuric acid | do | 6 |
| Boiled | hours | 1.7 |
| Still head temperature | °C | 100 |
| Distillate | cc | 810 |
| Aldehyde recovered | grams | 198 |
| Vinyl acetate | do | 213 |
| Overall yield | percent | 31 |
| Efficiency | do | 72 |

Overall yield is expressed as that percentage of the theoretical amount of vinyl acetate obtained based on the total amount of paraldehyde in the starting materials. Efficiency is that percentage of the reacted paraldehyde which appeared as vinyl acetate in the products.

Example 3

A batch of acetic anhydride (12 mols), paraldehyde (8 mols) and sulfuric acid (6 grams) was prepared and heated as in Example 2, but when the still head temperature reached 100° C. a mixture of acetic anhydride (40 mols), paraldehyde (40 mols) and sulfuric acid (30 grams) was added continuously during 7 hours. At the end of the addition, the reaction flask most probably contained substantially the same materials as at the beginning of the reaction plus an accumulation of about 10% of high boiling by-products. In continuous operation these by-products of high boiling point may be eliminated by drawing off portions of the reaction mixture, continuously if desired, into a tar pot, from which volatile products may be returned directly to the reaction kettle as vapors leaving the high boiling by-products behind.

Vinyl acetate was obtained from the distillate by fractionation as described in Example 2.

Tabulated data follow:

| | | |
|---|---|---|
| Acetic anhydride | grams | 5411 |
| Paraldehyde | do | 2114 |
| Mol ratio, aldehyde : anhydride | | 0.9 |
| Sulfuric acid | grams | 36 |
| Copper acetate | do | 1 |
| Boiled | hours | 7 |
| Still head temperature | °C | 105-115 |
| Kettle temperature | do | 142-143 |
| Distillate | grams | 5977 |
| Vinyl acetate | do | 1488 |
| Overall yield from paraldehyde | percent | 40 |
| Overall yield from anhydride | do | 41 |
| Efficiency from paraldehyde | do | 82 |
| Efficiency from anhydride | do | 68 |

Overall yields in these data are expressed as the percentages of the theoretical yield of vinyl acetate obtained based respectively on the total amounts of paraldehyde and acetic anhydride employed. Efficiencies are those percentages of the reacted paraldehyde and acetic anhydride respectively which appeared in the product as vinyl acetate.

From these results it will be seen that continuous operation represents improvement over batch operation.

Example 4

In this example the same procedure was used as in Example 3, except that the apparatus was still further modified to the preferred form shown in the drawing. Referring to the drawing, the raw materials were fed to a reaction kettle 10 by a pipe 11, and the kettle 10 was heated by a steam coil 12. The vapors were led directly to a continuous still 13 by a vapor pipe 14. The still 13 was provided with a tray-containing column 15 and kettle 16 heated by a steam coil 17. The vapor pipe 14 admits vapors near the middle of the column 15. The higher boiling constituents of the vapors entering the column 15 accumulate in the kettle 16 and are returned continuously to the kettle 10 by a pipe 18 provided with a liquid seal. Vapors from the top of the column 15 pass by a vapor line 19 to a second continuous still 20 provided with a tray-containing column 21 and a kettle 22 heated by a steam coil 23. From the column 21, vapors are removed by a pipe 24, condensed by a condenser 25 and removed as the heads-cut by a line 26. Liquid products in the still 20 are removed as a tails-cut from the kettle 22 by a line 27.

High boiling by-products which are formed in the reaction kettle 10 are continuously removed and separated by withdrawing portions of the reaction liquid from the kettle 10 by a pipe 28 into a tar pot 29 heated by a steam coil 30. Materials more volatile than the undesired by-products are volatilized by means of the steam coil 30 and returned as vapors to the kettle 10 by a line 31. The tar pot 29 is provided with a drain 32.

In operation, the vapors from the first continuous still 13 are fractionated in the second still 20 into a heads-cut containing vinyl acetate and acetaldehyde and a tails-cut containing acetic acid and acetic anhydride. The pure components are then separated from these fractions by ordinary fractional distillation.

This procedure eliminates the necessity for adding an anti-catalyst, such as sodium acetate (as described in Example 2), to prevent loss of vinyl acetate by combination with acetic acid to form ethylidene diacetate. This combination does not occur to any appreciable extent either in the vapor or in the liquid in the columns.

Instead of using paraldehyde as the source of acetaldehyde, the equilibrium mixture of acetaldehyde and paraldehyde obtained by treating acetaldehyde with sulfuric acid, or the similar mixture resulting when the recovered acetaldehyde stands in contact with accompanying traces of sulfur dioxide, may be used.

The process has been operated satisfactorily to produce vinyl propionate or vinyl butyrate by substituting propionic or butyric anhydride for acetic anhydride in the methods shown in the examples. In general, in each case substantially equimolar proportions of the anhydride and paraldehyde are preferred. If other aliphatic carboxylic anhydrides are employed their corresponding vinyl esters may be prepared. In the examples given, the process was conducted at pressures equal to or slightly above atmospheric pressure. However, reduced pressures can be employed, and the process can be operated at lower temperatures if subatmospheric pressures are used. This expedient was found to be especially advantageous in making the higher boiling esters, such as vinyl butyrate, in order to avoid excessively high reaction temperatures. In general, the reaction temperature should be between about 100° and 200° C. in order to insure adequate reaction velocity without excessive charring. The pressure should be such as to allow vigorous boiling at the reaction temperature chosen.

As noted above, other strong, non-volatile acids may be substituted for sulfuric acid as catalysts. However, phosphoric acid causes a greater formation of tar and carbonaceous residue, than does sulfuric acid, and toluene-sulfonic acid must be used in amounts equal to about twice the quantities of sulfuric acid required since it is a weaker acid. In general, any non-volatile, inorganic acid may be used which is strong enough to promote decomposition of paraldehyde into acetaldehyde at the boiling point of paraldehyde. I prefer to use the catalyst, especially sulfuric acid, in an amount equal to 0.25% to 2.0% of the raw material used, and within these limits, 0.5% gives the best results.

I claim:

1. Process for making vinyl esters which comprises heating acetaldehyde with a lower fatty acid anhydride in the presence of a non-volatile, inorganic acid catalyst, and continuously removing the vinyl ester corresponding to said acid anhydride as a distillate during said heating.

2. Process for making vinyl esters which comprises heating paraldehyde with a lower fatty acid anhydride in the presence of a non-volatile, inorganic acid catalyst, and continuously removing the vinyl ester corresponding to said acid anhydride as a distillate during said heating.

3. Process for making vinyl esters which comprises heating paraldehyde with one of the group consisting of anhydrides of acetic, propionic and butyric acids in the presence of a non-volatile, inorganic acid catalyst, and continuously removing the vinyl ester corresponding to said acid anhydride as a distillate during said heating.

4. Process for making vinyl esters which comprises heating a mixture containing paraldehyde, a lower fatty acid anhydride, and a non-volatile, inorganic acid catalyst to the boiling point of the mixture, and continuously removing the vinyl ester corresponding to said acid anhydride as a distillate during said heating.

5. Process for making vinyl esters which comprises boiling a mixture containing approximately equimolar proportions of paraldehyde and a lower fatty acid anhydride, together with a non-volatile, inorganic acid catalyst which is capable of decomposing paraldehyde into acetaldehyde at the boiling point of said mixture, and continuously removing the vinyl ester corresponding to said acid anhydride from said mixture as a distillate.

6. Process for making vinyl esters which comprises boiling a mixture containing approximately equimolar proportions of paraldehyde and a lower fatty acid anhydride, together with about 0.25% to about 2.0% by weight of the total of a non-volatile, inorganic acid catalyst which is capable of decomposing paraldehyde into acetaldehyde at the boiling point of said mixture, and continuously removing the vinyl ester corresponding to said acid anhydride from said mixture as a distillate.

7. Process for making vinyl esters which comprises boiling a mixture containing approximately equimolar proportions of paraldehyde and a lower fatty acid anhydride, together with a catalyst of the group consisting of sulfuric, phosphoric and toluene-sulfonic acids, and continuously removing the vinyl ester corresponding to said acid anhydride from said mixture as a distillate.

8. Process for making vinyl esters which comprises boiling a mixture containing approximately equimolar proportions of paraldehyde and a lower fatty acid anhydride, together with a catalyst of the group consisting of sulfuric, phosphoric and toluene-sulfonic acids, in an amount equal to from about 0.25% to about 2.0% by weight of the total, and continuously removing the vinyl ester corresponding to said acid anhydride from said mixture as a distillate.

9. Process for making vinyl acetate which comprises distilling a mixture of paraldehyde and acetic anhydride in the presence of a non-volatile, inorganic acid catalyst, and isolating vinyl acetate from the distillate.

10. Process for making vinyl acetate which comprises distilling a mixture of paraldehyde and acetic anhydride in substantially equimolar proportions in the presence of an acid catalyst of the group consisting of sulfuric, phosphoric and toluene-sulfonic acids, and isolating vinyl acetate from the distillate.

11. Process for making vinyl acetate which comprises distilling a mixture of paraldehyde and acetic anhydride in the presence of about 0.5% by weight of the total of sulfuric acid, and isolating vinyl acetate from the distillate.

12. Process for making vinyl propionate which comprises distilling a mixture of paraldehyde and propionic anhydride in the presence of a non-volatile, inorganic acid catalyst, and isolating vinyl propionate from the distillate.

13. Process for making vinyl propionate which comprises distilling a mixture of paraldehyde and propionic anhydride in substantially equimolar proportions in the presence of an acid catalyst of the group consisting of sulfuric, phosphoric and toluene-sulfonic acids, and isolating vinyl propionate from the distillate.

14. Process for making vinyl propionate which comprises distilling a mixture of paraldehyde and propionic anhydride in the presence of about 0.5% by weight of the total of sulfuric acid, and isolating vinyl propionate from the distillate.

15. Process for making vinyl butyrate which comprises distilling a mixture of paraldehyde and butyric anhydride in the presence of a non-volatile, inorganic acid catalyst, and isolating vinyl butyrate from the distillate.

16. Process for making vinyl butyrate which comprises distilling a mixture of paraldehyde and butyric anhydride in substantially equimolar proportions in the presence of an acid catalyst of the group consisting of sulfuric, phosphoric and toluene-sulfonic acids, and isolating vinyl butyrate from the distillate.

17. Process for making vinyl butyrate which comprises distilling a mixture of paraldehyde and butyric anhydride in the presence of about 0.5% by weight of the total of sulfuric acid, and isolating vinyl butyrate from the distillate.

GRANVILLE A. PERKINS.